US008264531B2

(12) United States Patent
Jung et al.

(10) Patent No.: US 8,264,531 B2
(45) Date of Patent: Sep. 11, 2012

(54) DRIVER'S STATE MONITORING SYSTEM USING A CAMERA MOUNTED ON STEERING WHEEL

(75) Inventors: Ho Choul Jung, Seoul (KR); Byoung Joon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 784 days.

(21) Appl. No.: 12/466,431

(22) Filed: May 15, 2009

(65) Prior Publication Data
US 2010/0002075 A1 Jan. 7, 2010

(51) Int. Cl.
H04N 7/18 (2006.01)
G06F 15/16 (2006.01)

(52) U.S. Cl. .......................................... 348/78; 348/184

(58) Field of Classification Search .................... 348/78, 348/148
See application file for complete search history.

(56) References Cited

U.S. PATENT DOCUMENTS

| | | | |
|---|---|---|---|
| 2006/0202843 A1* | 9/2006 | Ota | 340/576 |
| 2007/0124030 A1* | 5/2007 | Mori et al. | 701/1 |
| 2007/0159531 A1* | 7/2007 | Anderson | 348/148 |
| 2009/0268025 A1* | 10/2009 | Hiramaki et al. | 348/148 |
| 2011/0025836 A1* | 2/2011 | Tamaki et al. | 348/78 |

* cited by examiner

Primary Examiner — Zarni Maung
(74) Attorney, Agent, or Firm — Edwards Wildman Palmer LLP; Peter F. Corless

(57) ABSTRACT

The status of a driver is monitored by facial images captured by a camera mounted on the steering wheel of a vehicle. The captured image is tilt corrected by a steering angle. The status of the driver can be monitored efficiently.

10 Claims, 17 Drawing Sheets

DRIVER'S STATE MONITORING SYSTEM USING A CAMERA MOUNTED ON STEERING WHEEL

CROSS-REFERENCE TO RELATED APPLICATION

This application claims under 35 U.S.C. §119(a) the benefit of Korean Patent Application No. 10-2008-64862 filed Jul. 4, 2008, the entire contents of which are incorporated herein by reference.

BACKGROUND

1. Field of the Invention

The present invention relates to a system for monitoring the status of a vehicle driver on the basis of a captured image of the driver.

2. Description of the Related Art

Generally, an Advanced Safety Vehicle (ASV) refers to a vehicle designed to reduce the number of deaths caused by traffic accidents, a vehicle capable of relieving drivers' fatigue, or a vehicle designed to be easily driven. Safety technology used for the ASV may include a system for monitoring the status of a driver, a system for sensing obstacles at night, and a system for providing a warning signal of the dangerous status of a vehicle.

Among these systems, the driver status monitoring system determines whether a driver dozes off while he or she is driving, through the analysis of images obtained by capturing the behavioral status of a driver, such as the blinking of the driver's eyes, using a camera, and/or the use of signals input from various types of manipulation switches, such as a brake switch and a steering switch, and provides a warning signal to the driver, thus awaking the driver who dozes off while driving and allowing the driver to safely drive the vehicle.

Such a driver status monitoring system requires a camera capable of capturing the front face of a driver. For example, the camera may be mounted in an instrument cluster, an upper portion of a steering column, or an interior mirror placed in a vehicle.

However, when the camera is mounted in the instrument cluster or the upper portion of the steering column, there is a problem in that, when a steering wheel is rotated, it blocks the camera. Further, when the camera is mounted on the room mirror placed in the vehicle, the camera is not influenced by the rotation of the steering wheel, but there is a problem in that since the room mirror is placed at a position higher than the face of a driver, captured images are ones viewed downwards from the above, and in that since the camera is placed at a distance from the face of the driver, it is difficult to precisely monitor the status of the driver.

The above information disclosed in this Background section is only for enhancement of understanding of the background of the invention and therefore it may contain information that does not form the prior art that is already known in this country to a person of ordinary skill in the art.

SUMMARY

The present invention provides a system for monitoring a status of a driver, which comprises an image capturing unit and a control unit. The image capturing unit is provide for capturing an image of the face of a driver using a camera mounted on the steering wheel of a vehicle. The control unit is provided for correcting a tilt of the captured image received from the image capturing unit by rotating the captured image by a steering angle, and extracting characteristic parts of the face of the driver from the corrected image, thus determining the status of the driver.

Preferably, the camera may be mounted at a center portion of the steering wheel. In this case, suitably, the camera and an airbag may be mounted independently.

Preferably, the steering angle may be calculated using a value input from a Steering Angle Sensor (SAS).

Preferably, the corrected image may be adjusted to have the same size as that of the image before the correction. The adjustment can be made by cutting away edge portions, which exceed a range of processing of the image before correction, so as to have a size corresponding to the size of the image before correction.

Preferably, the characteristic parts of the face of the driver may be extracted through histogram analysis, edge analysis, and/or labeling analysis of the corrected image.

Preferably, the characteristic parts of the face of the driver may be eyes of the driver. The status of the driver may be determined using a degree of blinking of the eyes and/or an open degree of the eyes.

Preferably, the open degree of the eyes may be calculated using a difference between a maximum peak value and a minimum peak value in a differential value graph, indicating differential values of density variation at a position estimated to be a center portion of each eye of the driver.

Preferably, a camera having vibration prevention or vibration correction function may be used.

Preferably, when the steering angle is over a certain angle, the tilt correction and the characteristic parts extraction can be skipped.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of a system for monitoring the status of a driver, which determines the status of a driver on the basis of a driver's image captured by a camera mounted on a steering wheel according to the present invention will be described in detail with reference to the attached drawings.

Figure 1:
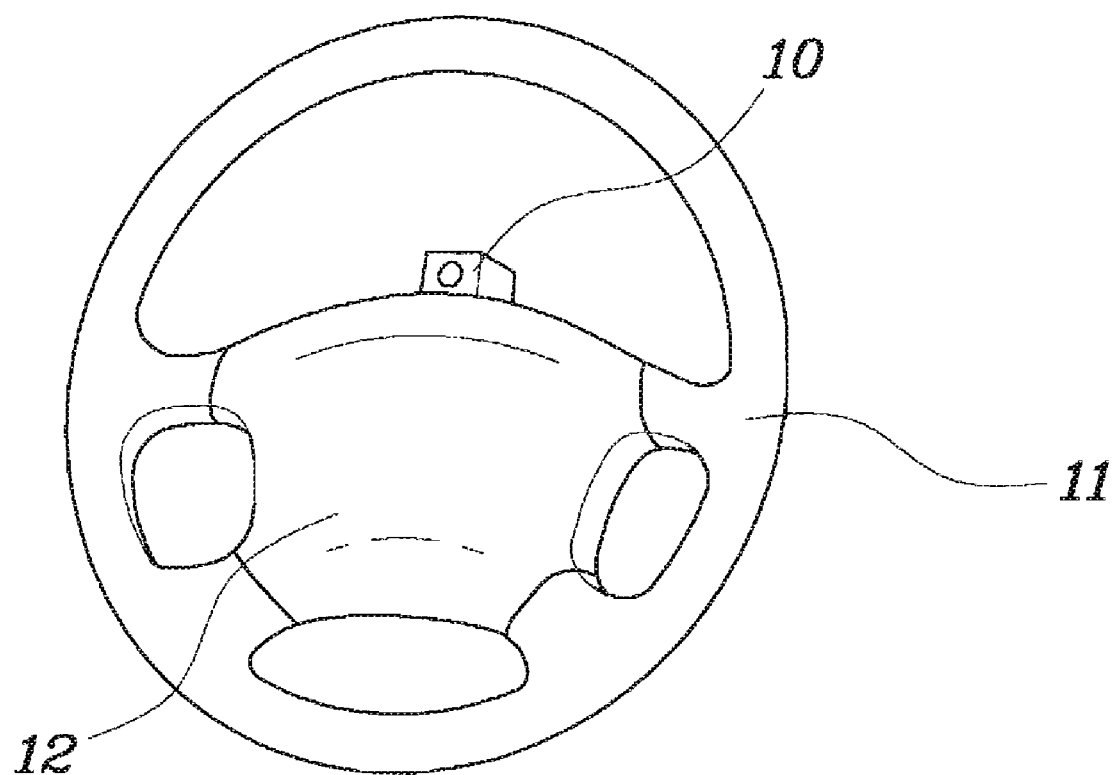
FIG. 1 is a diagram showing the mounting location of a camera for capturing a driver's image in a system for monitoring the status of a driver according to an embodiment of the present invention.

FIG. 1 is a diagram showing the mounting location of a camera for capturing a driver's image in a system for monitoring the status of a driver according to an embodiment of the present invention.

Referring to FIG. 1, a camera 10 for capturing a driver's image is mounted on the steering wheel 11 of a vehicle. In particular, when the camera 10 is mounted in a center portion 12 of the steering wheel, it is preferable to mount the camera 10 independently of an airbag, which operates at or near the center portion 12 of the steering wheel. In this case, the term 'mount independently' means that the camera is mounted so as not to be interfered with by the operation of the airbag. For example, as shown in FIG. 1, the camera 10 can be attached to the top of the cushion cover of the steering wheel center portion 12. When an airbag is operated and an airbag cushion is inflated in the event that the vehicle is involved in a collision, the camera can be prevented from moving forwards together with the cushion.

In the case where the camera 10 is mounted on the steering wheel 11, the camera 10 is not blocked even when the steering wheel 11 is rotated, and thus the driver can be monitored even when the vehicle is traveling along a curved road as well as a straight road. Further, there is an advantage in that the camera 10 is located relatively close to the front face of the driver, thus enabling the status of the driver to be more precisely determined.

Figure 2A:
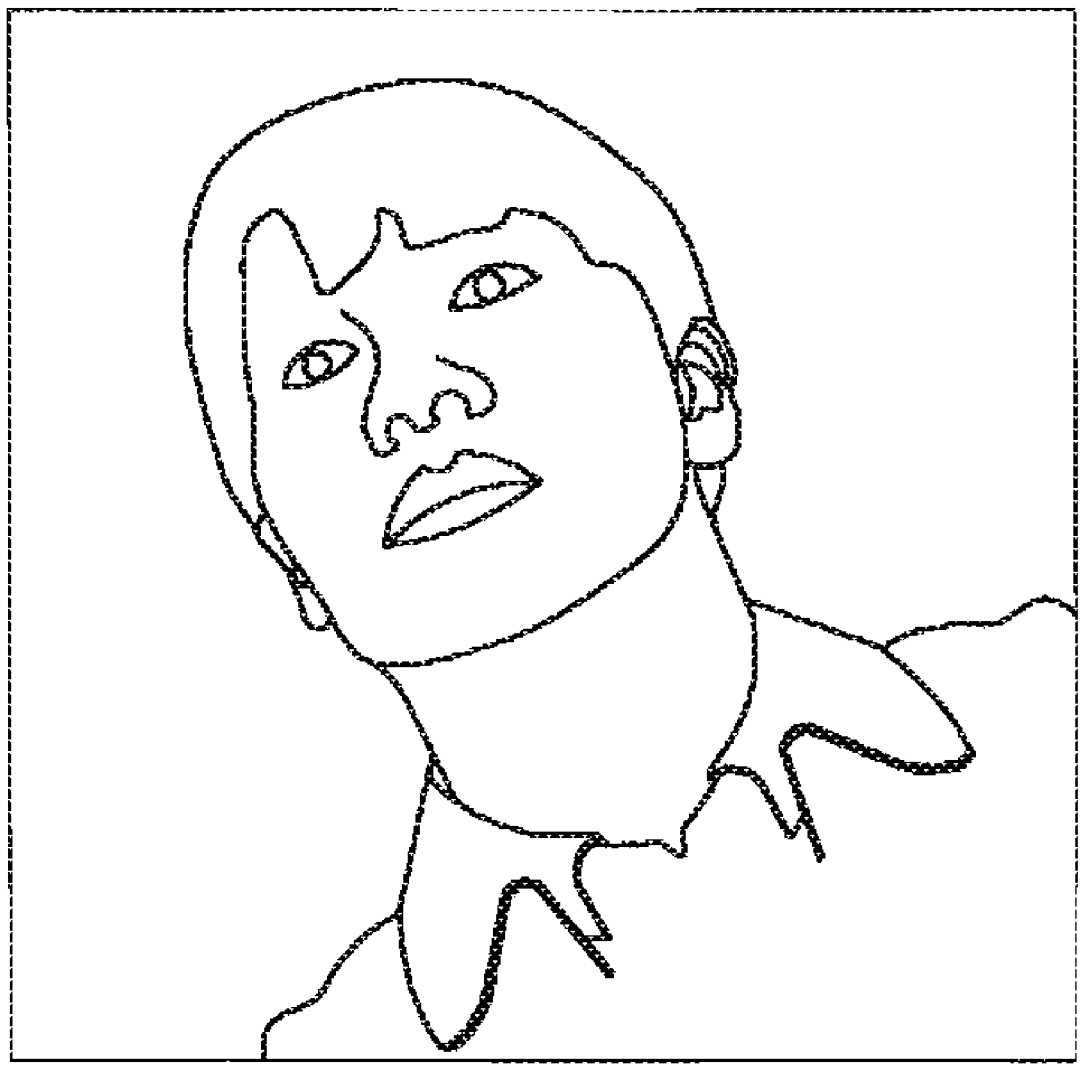
FIGS. 2A to 2C are diagrams showing examples in which an image of a driver's face captured by a mounted camera is rotated along with the rotation of a steering wheel according to an embodiment of the present invention.
Figure 2B:
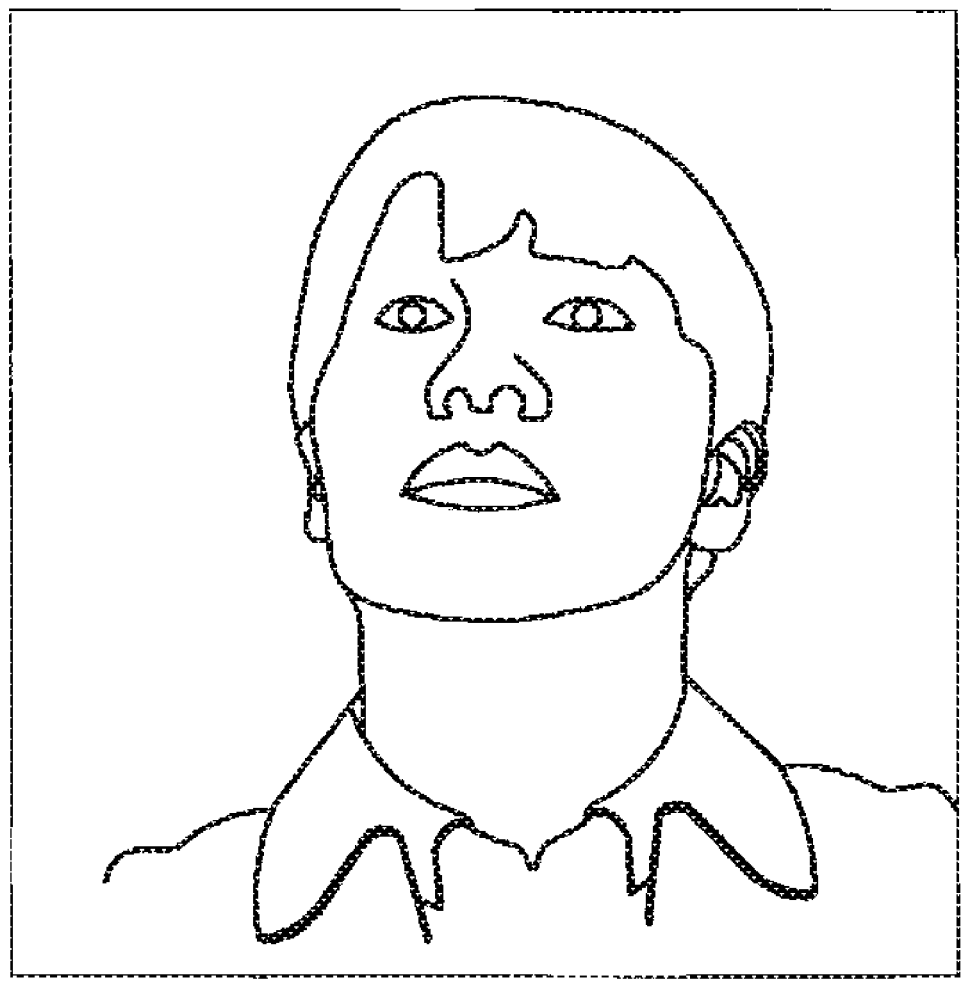
Figure 2C:
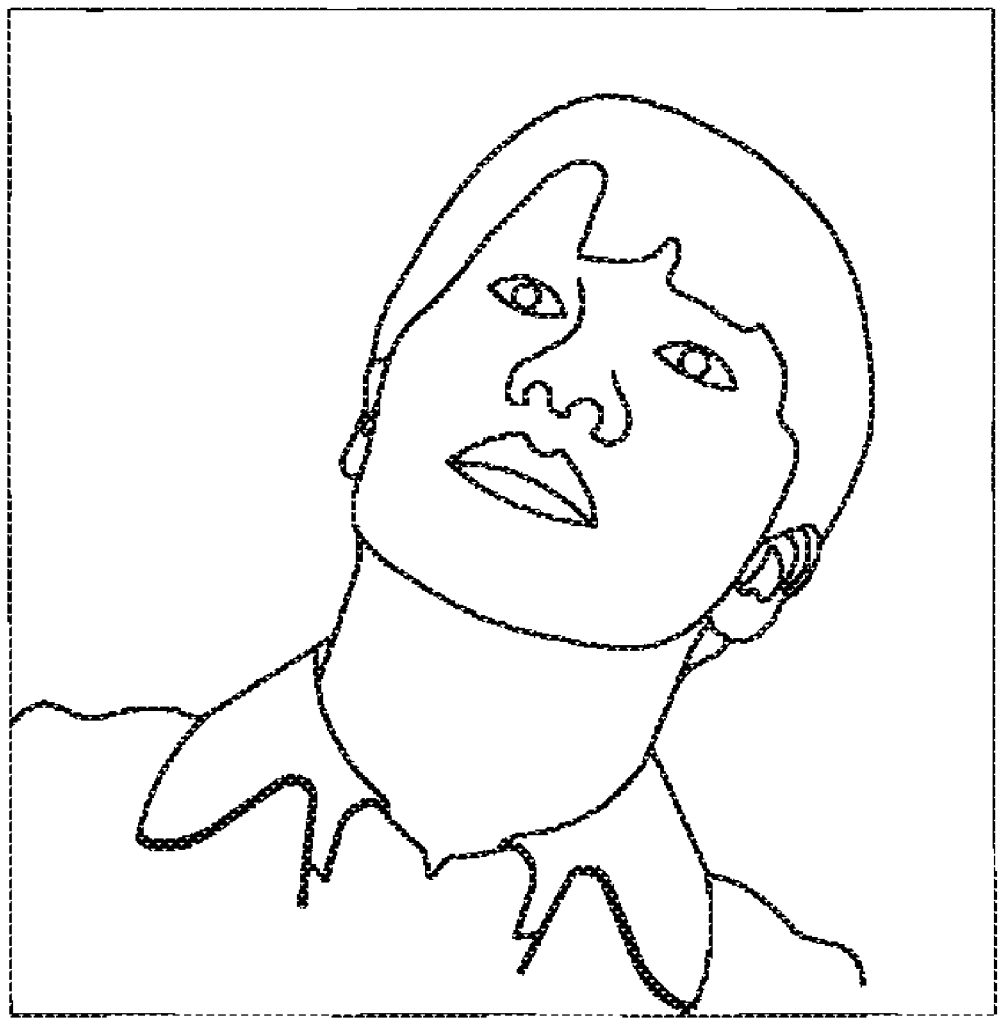

FIGS. 2A to 2C are diagrams showing examples in which an image of a driver's face captured by a mounted camera is rotated along with the rotation of a steering wheel according to an embodiment of the present invention.

FIG. 2A illustrates the facial image of a driver captured by the camera 10 mounted on a steering wheel 11 when the driver turns the steering wheel 11 to the right while driving. FIG. 2B illustrates the facial image of the driver captured by the camera when the driver does not turn the steering wheel 11. FIG. 2C illustrates the facial image of the driver captured by the camera when the driver turns the steering wheel 11 to the left.

As shown in FIGS. 2A to 2C, when the camera is mounted on the steering wheel, the camera is rotated along with the steering wheel, and thus an image is captured by the camera with a tilt applied to the image. When the image tilted by the rotation of the camera is used, the status of the driver may not be precisely determined. Accordingly, as described below, a steering angle is used to correct the tilt of the captured image.

Figure 3:
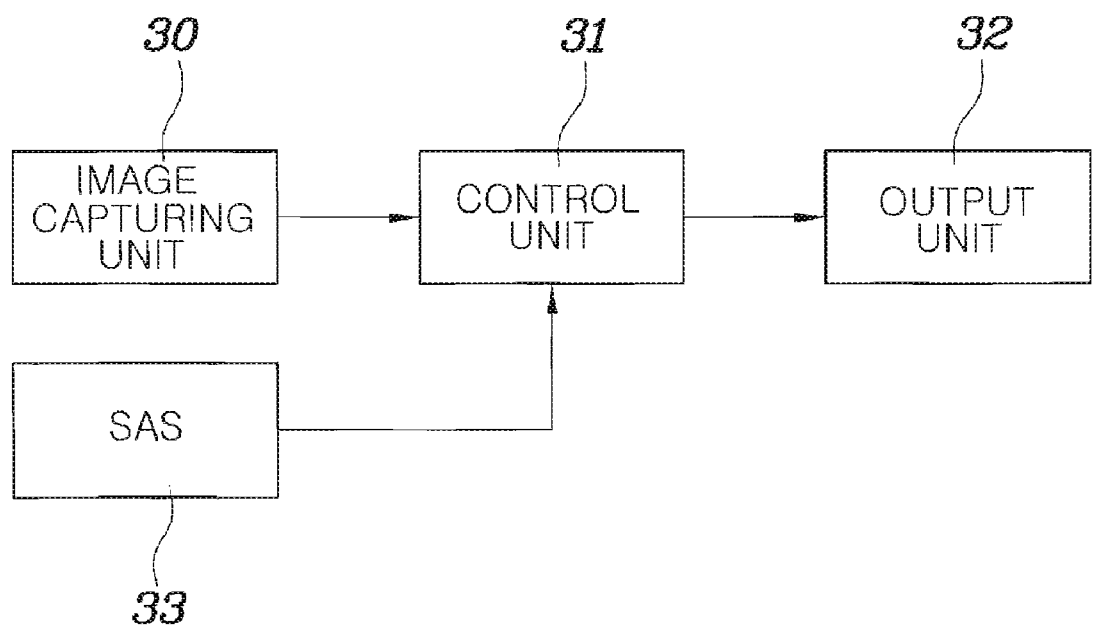
FIG. 3 is a block diagram of a system for monitoring the status of a driver according to an embodiment of the present invention.
Figure 4:
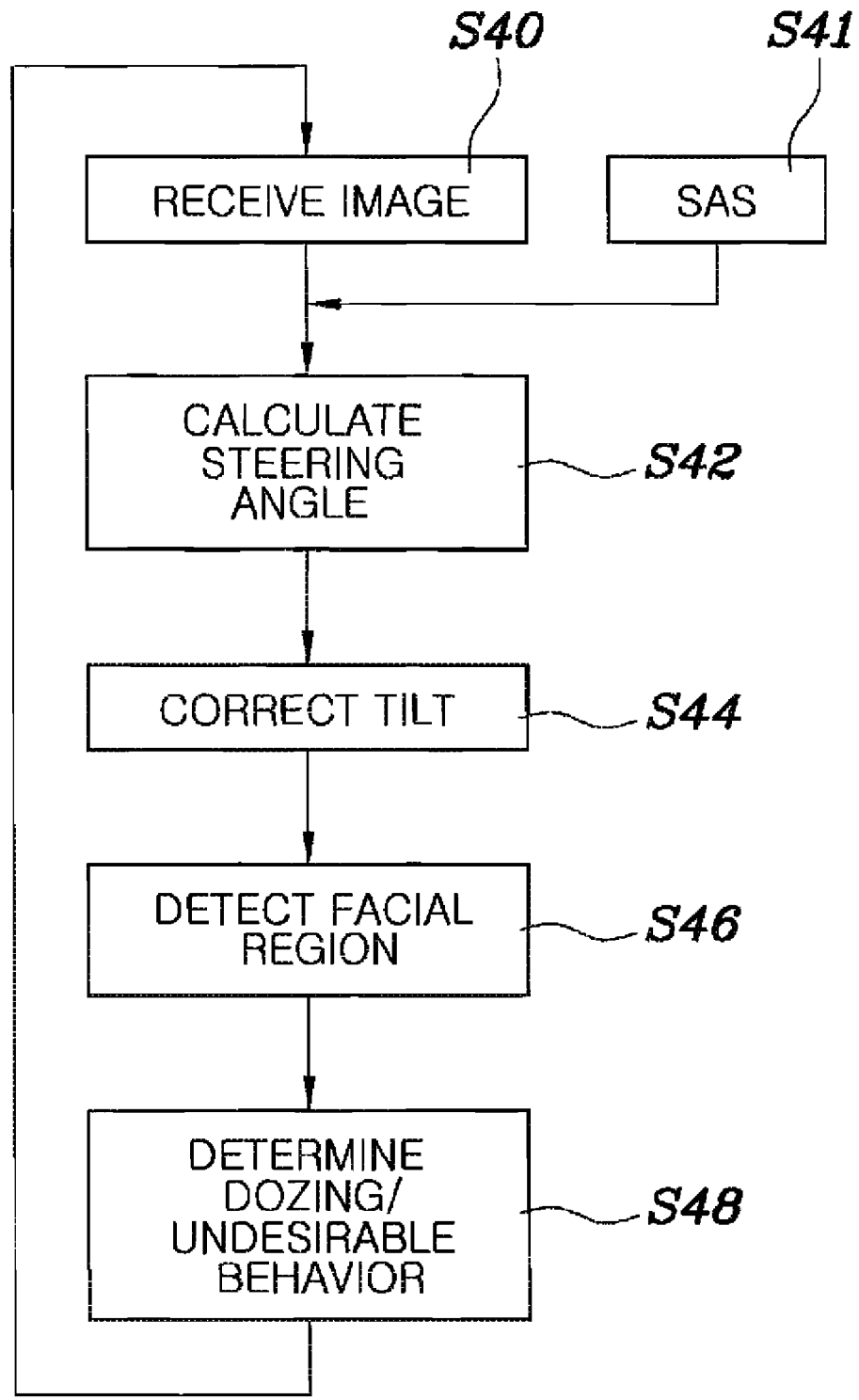
FIG. 4 is a flowchart showing the exemplary operation of a system for monitoring the status of a driver according to an embodiment of the present invention.

FIG. 3 is a block diagram of a system for monitoring the status of a driver according to an embodiment of the present invention and FIG. 4 is a flowchart showing the exemplary operation of the driver status monitoring system according to an embodiment of the present invention.

Referring to FIG. 3, the system includes an image capturing unit 30, a control unit 31, output unit 32 and a Steering Angle Sensor (SAS) 33.

At step S40, the control unit 31 receives from the image capturing unit 30 an image of the driver's face captured by the camera mounted on the steering wheel of the vehicle. In this case, the facial image of the driver may be an image to which a tilt is applied.

Further, at step S41, the control unit 31 receives information about a steering angle from the SAS 33. The steering angle information received from the SAS 33 may be an actual angle value in degrees (°) or in radians. Alternatively, the steering angle information may be an angular acceleration value, which is variation in angular velocity over time, in radians per second squared (rad/s$^2$). When the steering angle information is an angular acceleration value, the angular acceleration value is converted into an angle in degrees (°) or radians, thereby calculating the steering angle θ at step S42.

At step S44, the tilt of the image received from the image capturing unit 30 can be corrected using the steering angle θ. The following Equation [1] shows an example of a rotational transform equation.

$$\begin{pmatrix} x2 \\ y2 \end{pmatrix} = \begin{pmatrix} \cos\theta & -\sin\theta \\ \sin\theta & \cos\theta \end{pmatrix} \begin{pmatrix} x1 \\ y1 \end{pmatrix} \quad [1]$$

In Equation [1], x1 and y1 are coordinates corresponding to an orthogonal coordinate system at each pixel on the image before correction, and x2 and y2 are coordinates corresponding to an orthogonal coordinate system at each pixel on the image after correction. As sine and cosine values of the steering angle θ are used, even when the steering wheel is rotated by an angle greater than 360°, the same results as those obtained in consideration of the angle to which the camera is finally rotated can be obtained.

After the tilt correction, the size of the image may increase because the image is rotated by the steering angle θ. The size of the image has to fall within a range that must be read at the time of image processing. Normally the image has a rectangular shape including the entire image. That is, when the image, obtained before the tilt is corrected, is rotated by the steering angle θ, the edge portions of the image exceed the range of image processing for the image obtained before correction, and the entire image size increases to include the edge portions.

The tilt corrected image can be adjusted to be the same size as the pre-correction image. This can be performed, for example, by cutting away the edge portions of the corrected image, which exceed the processing range of the pre-correction image, so as to have the same size as that of the pre-correction image. Through this adjustment, the amount of calculation, which may have otherwise increased due to the increased entire size of the image after the correction, can be reduced.

Figure 5A:
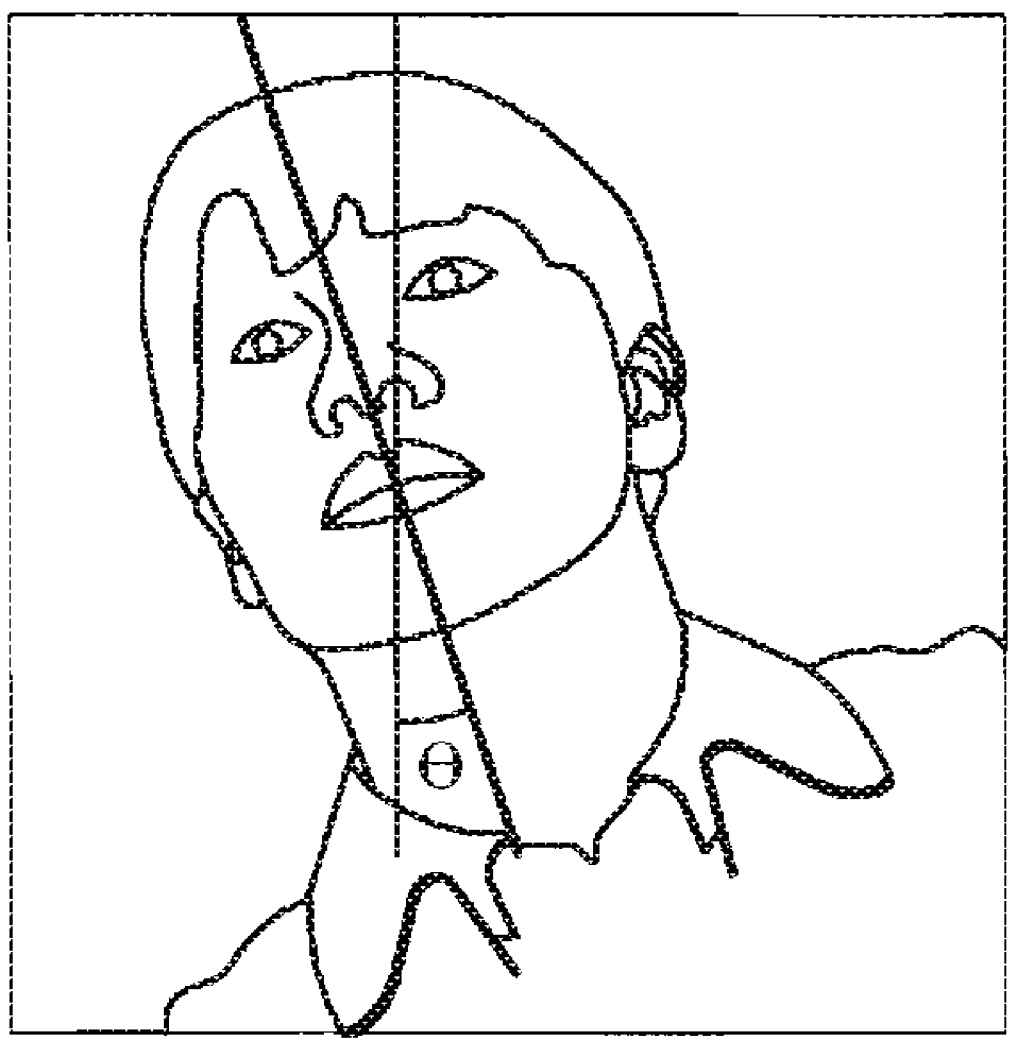
FIGS. 5A to 5C are diagrams showing respective procedures for correcting an image rotated with the rotation of a steering wheel according to an embodiment of the present invention.
Figure 5B:
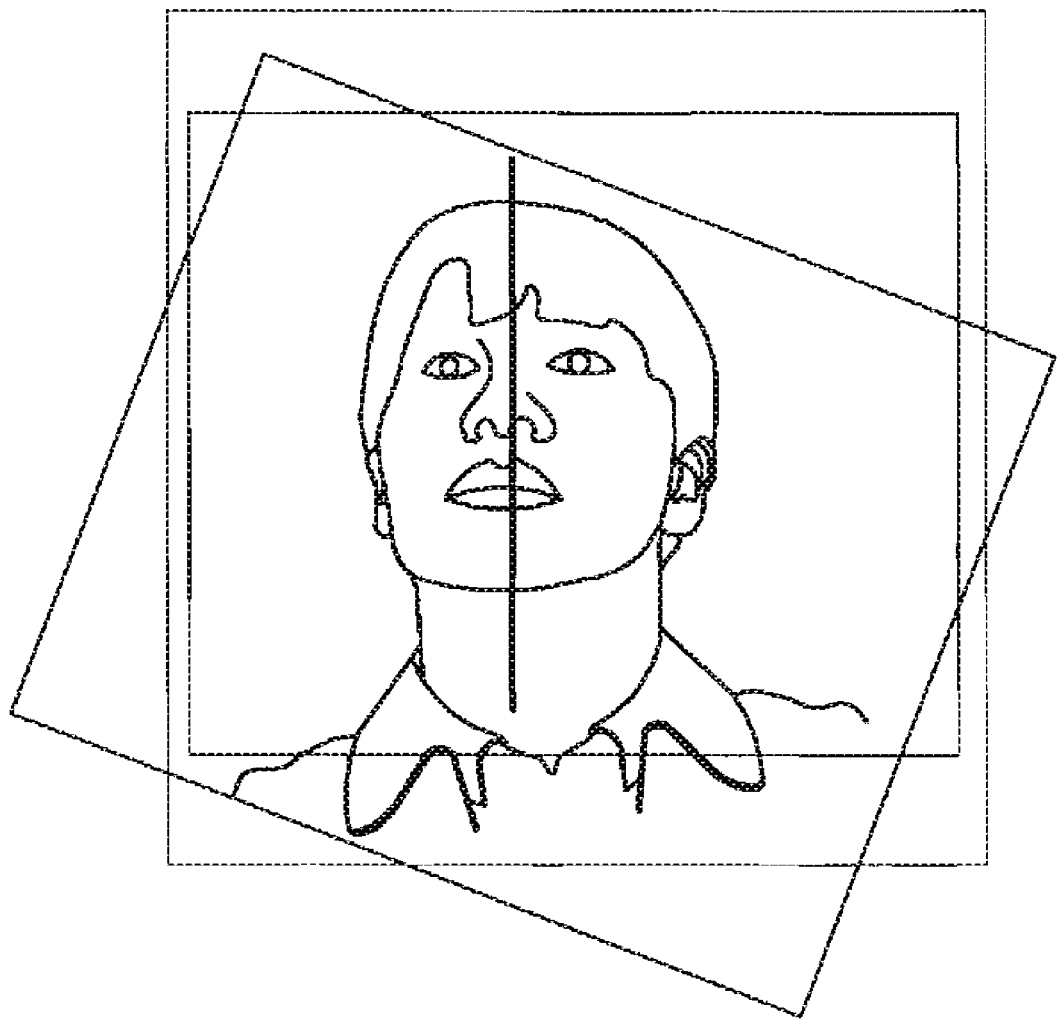
Figure 5C:
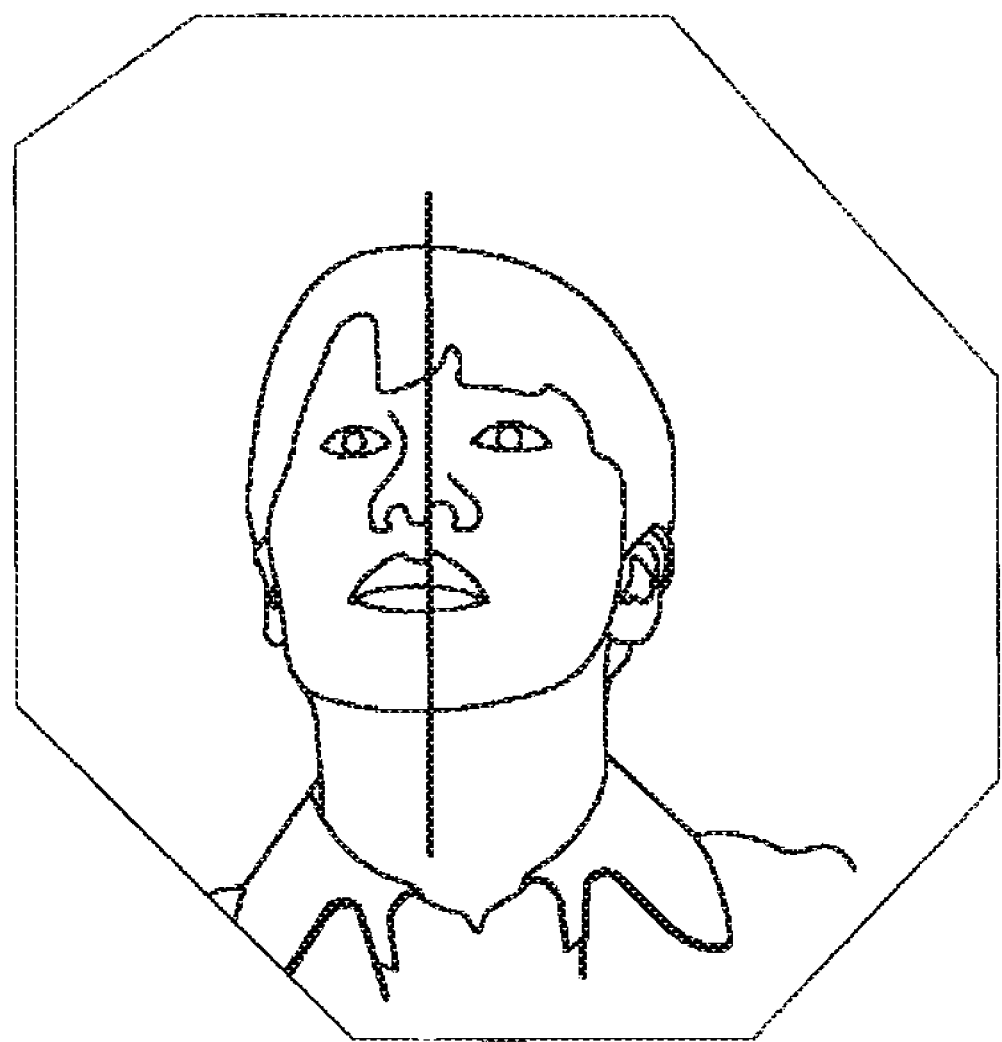

FIGS. 5A to 5C are diagrams showing respective procedures for correcting an image rotated with the rotation of a steering wheel according to an embodiment of the present invention.

FIG. 5A illustrates an image tilted by the rotation of a steering wheel. FIG. 5B illustrates an image corrected using a steering angle θ. FIG. 5C illustrates an image adjusted so as to have the size of the pre-correction image.

Meanwhile, since the camera moves along with the steering wheel, it may be vibrated, in which case a captured image may be so unclear that it is hard to detect the driver's face. Therefore, it is possible to use a camera having a vibration correction function, or to perform vibration correction processing together with the above-described rotation correction at the time of correcting a tilted image.

Referring back to FIG. 4, at step S46, a facial region is detected to determine the status of the driver using the image, the tilt of which has been corrected. Here, the facial region can be detected through, for example, histogram analysis related to the difference in the density of an image.

Further, a group of candidates for characteristic parts of a face, such as the eyes, nose, and mouth, can be found by detecting a shape having horizontal characteristics from an image through the analysis of edges, especially, horizontal edges. Further, an ultimate facial region can be detected by extracting a final candidate from the group of candidates through labeling analysis of comparing the geometric relationships based on the distribution of respective characteristic parts of the face, such as eyes, nose, and mouth.

FIGS. 6A to 6E are diagrams showing respective procedures for detecting a facial region in a captured image according to an embodiment of the present invention.

Figure 6A:
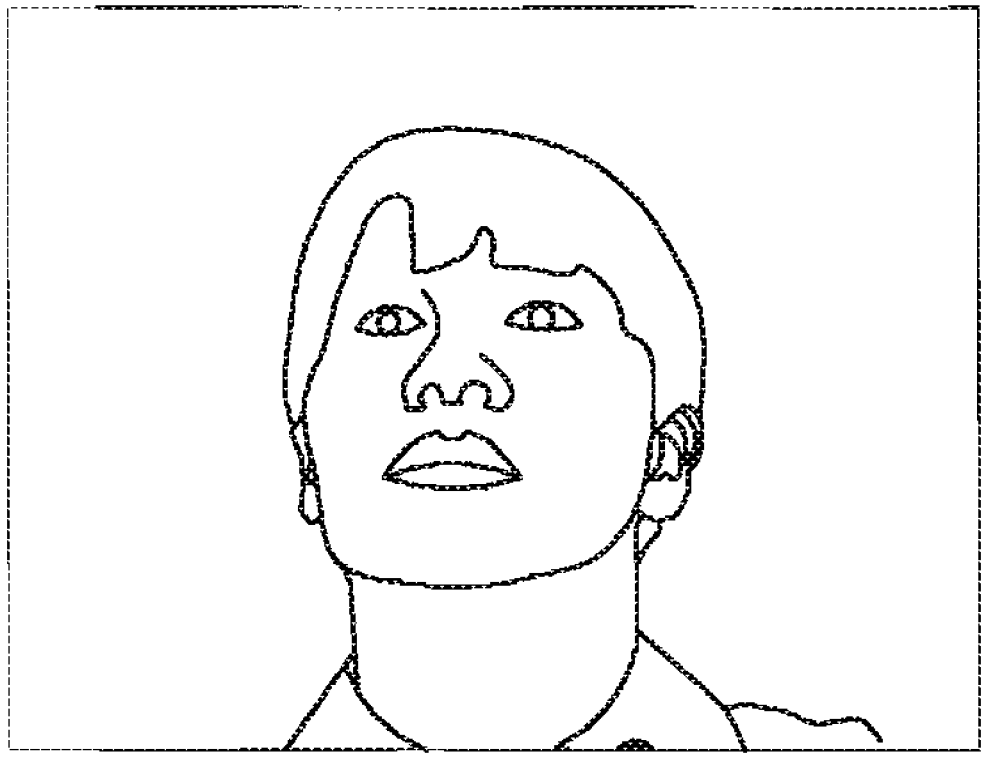
FIGS. 6A to 6E are diagrams showing respective procedures for detecting a facial region in a captured image according to an embodiment of the present invention.
Figure 6B:
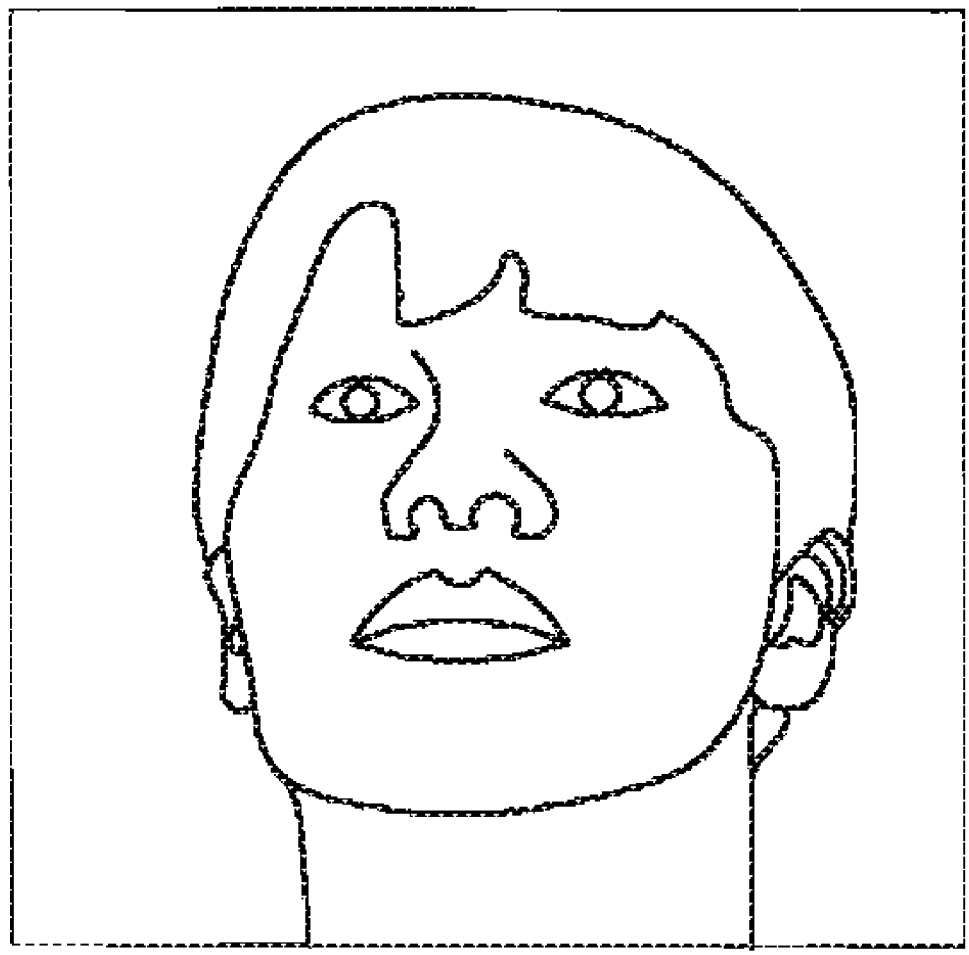
Figure 6C:
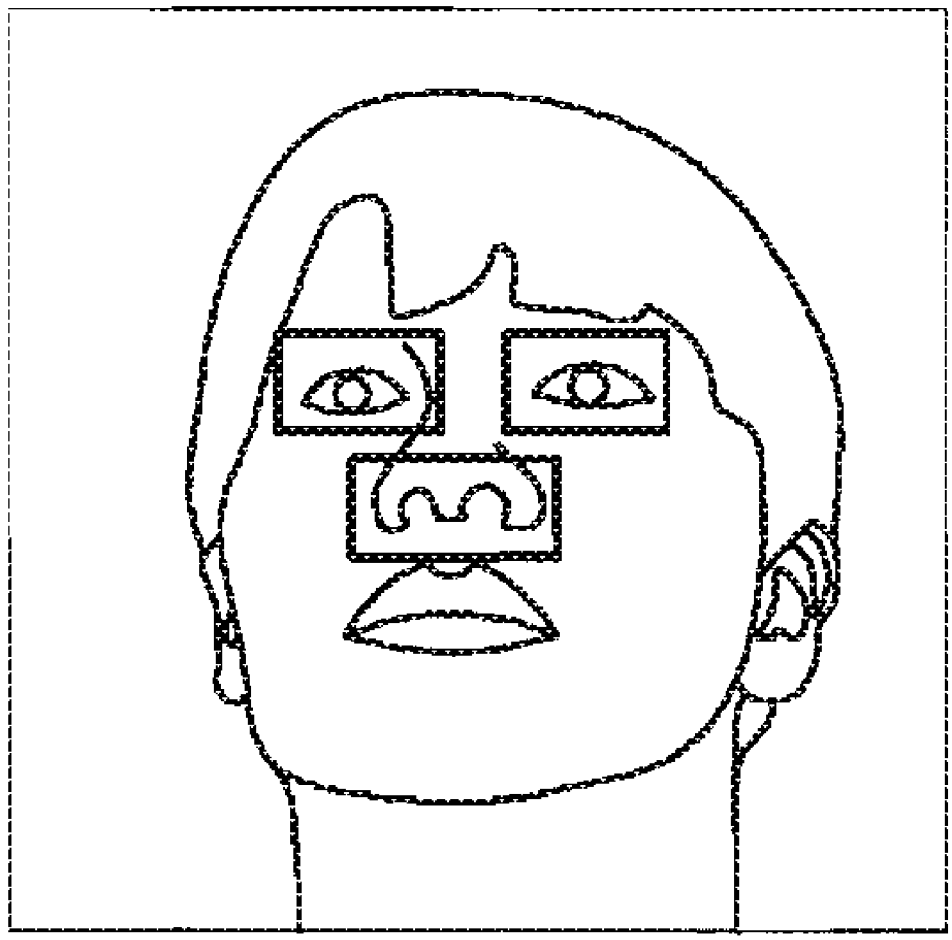
Figure 6D:
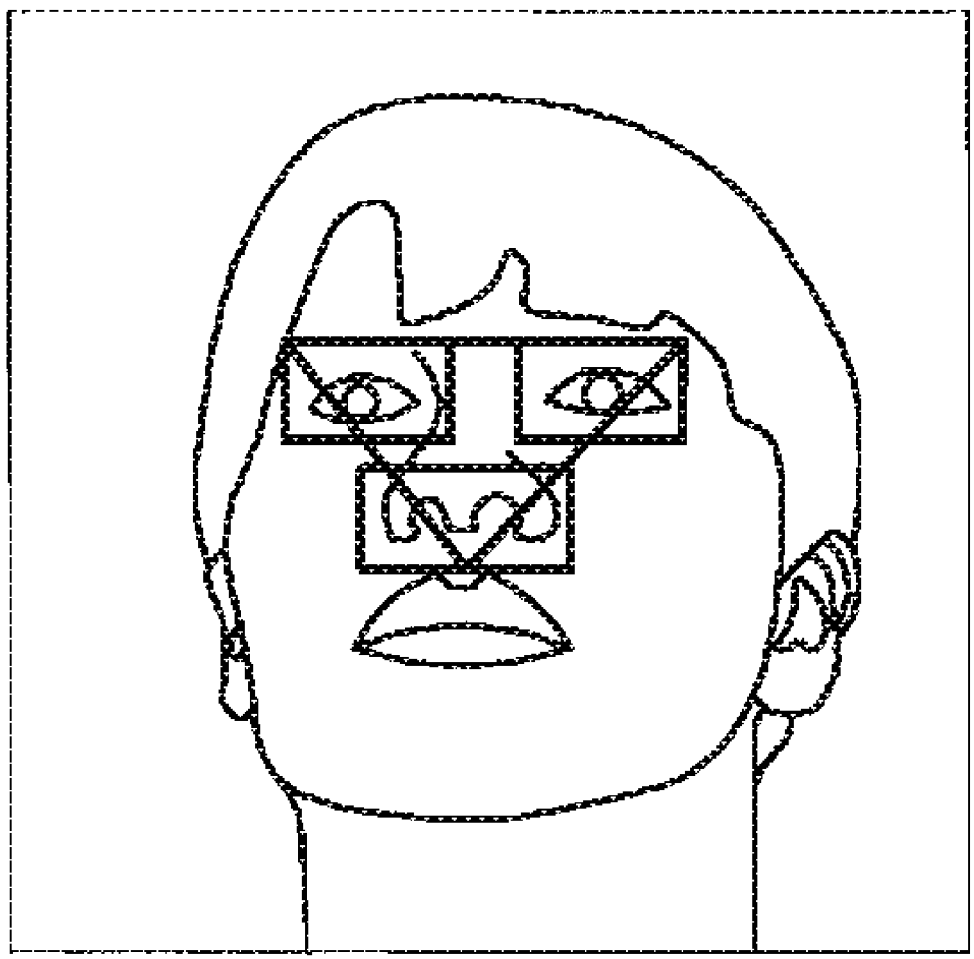
Figure 6E:
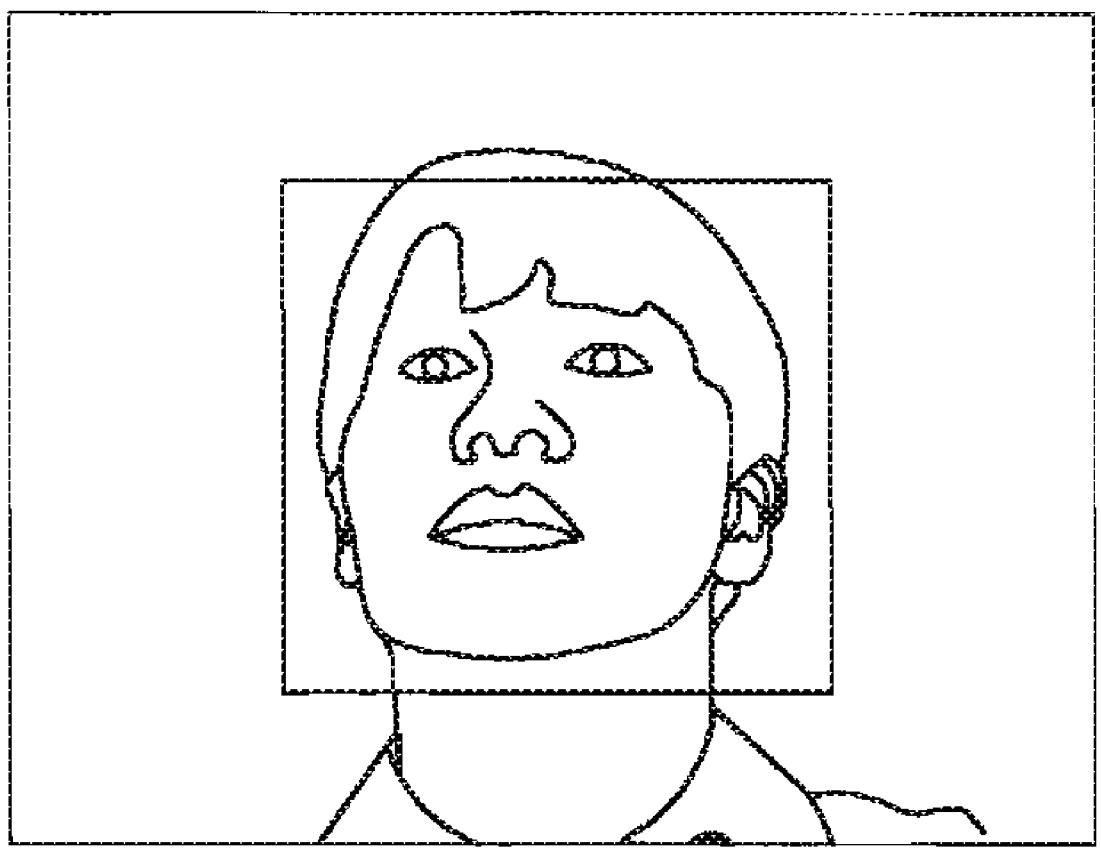

FIG. 6A illustrates an image, the tilt of which has been corrected, and FIG. 6B illustrates the results of image processing based on histogram analysis. Further, FIG. 6C illustrates the results of image processing based on the analysis of edges, especially horizontal edges, to detect a group of candidates of characteristic parts, and FIG. 6D illustrates the results of image processing performed through labeling analysis of comparing the geometric features of respective characteristic parts with each other. Further, FIG. 6E illustrates the results of image processing for displaying the ultimately detected facial region.

Referring back to FIG. 4, at step S48, the status of the driver is determined on the basis of the detected facial region and respective characteristic parts in the face. For example, it is determined whether the eyes are open or closed by calculating the size of the eyes of the driver, that is, the open degree of the eyes, thus determining whether the driver dozes off while driving.

Figure 7A:
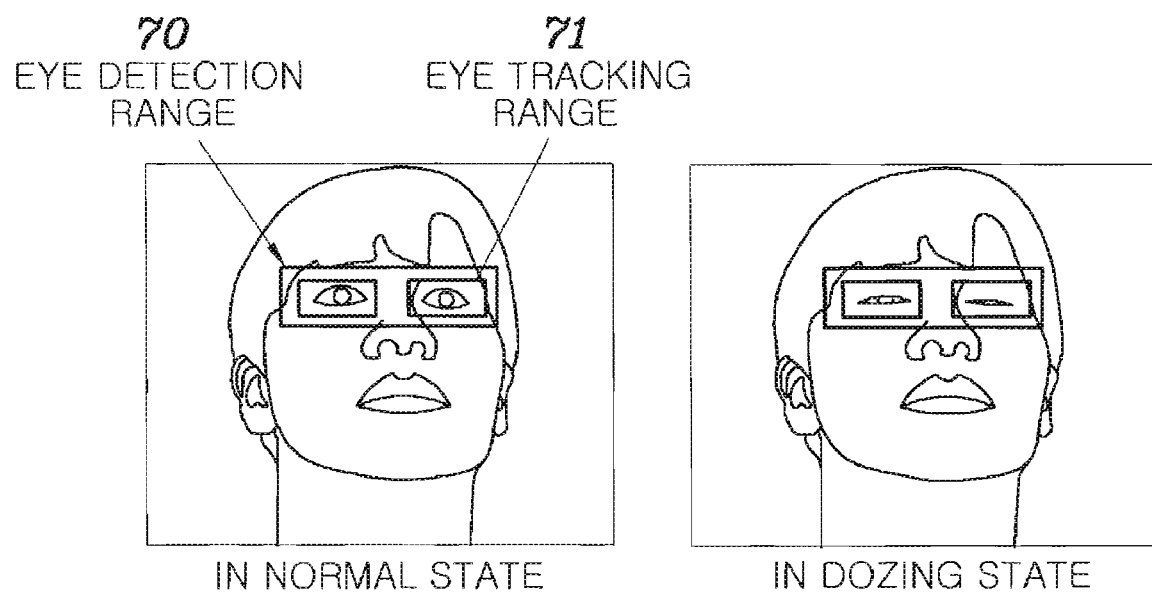
FIGS. 7A to 7C are diagrams showing a process for determining the status of a driver by calculating the open degree of the eyes according to an embodiment of the present invention.
Figure 7B:
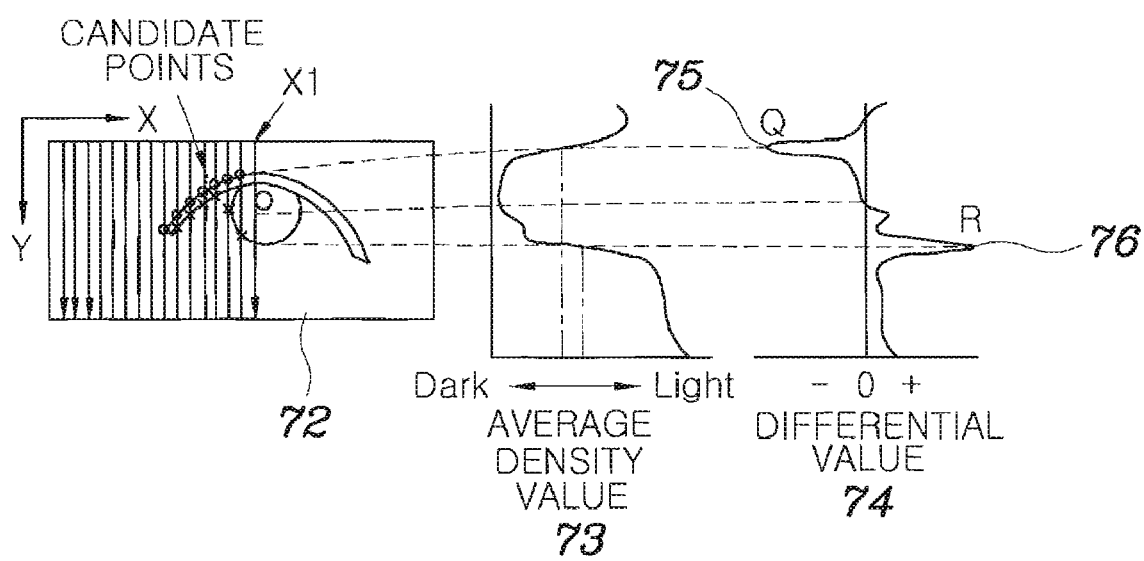
Figure 7C:
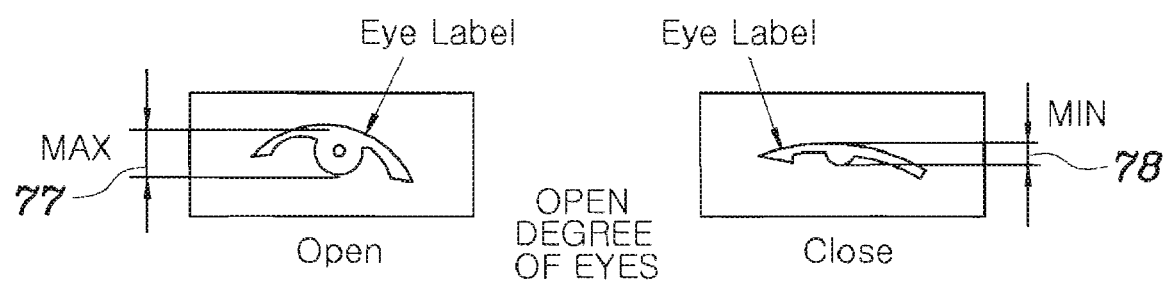

FIGS. 7A to 7C are diagrams showing a process for calculating the open degree of eyes and determining the status of a driver according to an embodiment of the present invention.

FIG. 7A illustrates an eye detection range 70 and an eye tracking range 71 based on the results of histogram analysis. In this case, the eye tracking range 71 can be determined in consideration of the typical shape of eyes, for example, an elliptical shape, and the size of the eyes, within the eye detection range 70.

Further, FIG. 7B illustrates a density value graph 73, indicating densities varying along a y axis versus an x axis coordinate value (x1), which is determined to be a center portion of the pupil in an eye shape 72 present in the eye tracking range 71, and a differential value graph 74 indicating differential values of density variation based on the density value graph 74. In the differential value graph 74, the range of density variation can be detected. The open degree of the eyes can be detected using the difference between the minimum peak value (Q) 75 and the maximum peak value (R) 76.

Further, FIG. 7C illustrates the comparison of the open degrees of eyes when the eyes are open and when the eyes are presumed to be almost closed. That is, if the open degree of the eyes is equal to or greater than a predetermined reference value 77, it may be determined to be the state in which the eyes are open. On the other hand, if the open degree is less than a predetermined reference value 78, it may be determined to be the state in which the eyes are almost closed.

In addition to the above method, various methods of determining the dozing state of the driver through the eyes of the driver can be used. For example, whether the driver's motion of closing and opening eyes, that is, blinking, occurs can be used to determine the dozing state of the driver. That is, if this motion does not occur in a predetermined period, it may be determined that the driver dozes off while he or she is driving.

Furthermore, the present methods can be used in consideration of various cases interfering with safe driving. As a non-limiting example, if an object (e.g., a mobile phone or the like) other than the shape of a human body is detected on the right or left side of the facial range of the driver, it may be determined that the driver is using the object distracting the driver's attention while driving.

On the basis of the results of determination of the driver status at step S48, the output unit 32 takes an action corresponding to the determined status. For example, when it is determined that the driver dozes off while he or she is driving, a warning signal can be provided to the driver. Further, when it is determined that the driver is using a distracting object (e.g., a mobile phone) without using a hands-free device while he or she is driving, a warning signal can be provided to the driver.

In an embodiment, when the steering angle is over a certain angle (e.g., 90°), the control unit 31 may control not to perform the tilt correction and the characteristic parts extraction. Because although it may be very rare that the driver is in the dozing state when the driver turns the steering wheel 11 to the right or left for the steering angle θ to be over the certain angle (e.g., 90°) while driving, the degree being corrected according to the steering angle θ is too large, an error associated with the status of the driver may occur. Thus, in this case, the tilt correction and the characteristic parts extraction can be skipped.

According to the present systems, the visual field of a camera mounted at the steering wheel of a vehicle is not blocked by the rotation of the steering wheel, thus enabling the driver's state to be monitored precisely and efficiently.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for monitoring the status of a driver of a vehicle, comprising:
    an image capturing unit for capturing an image of the face of a driver using a camera mounted on the steering wheel of the vehicle; and
    a control unit for correcting a tilt of the captured image received from the image capturing unit by rotating the captured image by a steering angle to provide a corrected image, and extracting characteristic parts of the face of the driver from the corrected image, thus determining the status of the driver.

2. The system according to claim 1, wherein the camera and an airbag are independently mounted at a center portion of the steering wheel of the vehicle.

3. The system according to claim 1, wherein the steering angle is calculated using a value input from a Steering Angle Sensor (SAS).

4. The system according to claim 1, wherein the corrected image is adjusted to have the same size as the image before the correction, by cutting away edge portions, which exceed a range of processing the image before correction, so as to have the same size as that of the image before correction.

5. The system according to claim 1, wherein the characteristic parts of the face of the driver are extracted through histogram analysis, edge analysis, and labeling analysis, or combination thereof.

6. The system according to claim 1, wherein the characteristic parts of the face of the driver are eyes of the driver and the status of the driver is determined using an open degree of the eyes.

7. The system according to claim 6, wherein the open degree of the eyes is calculated using a difference between a maximum peak value and a minimum peak value in a differential value graph, indicating differential values of density variation at a position estimated to be a center portion of each eye of the driver.

8. The system according to claim 1, wherein the characteristic parts of the face of the driver are eyes of the driver and the status of the driver is determined using a degree of blinking of the eyes.

9. The system according to claim 1, wherein the corrected image is obtained by using a camera having vibration prevention or vibration correction function.

10. The system according to claim 1, wherein the control unit does not perform the tilt correction and the characteristic parts extraction when the steering angle is over a certain angle.

* * * * *